US008672199B1

(12) United States Patent
Ditore et al.

(10) Patent No.: US 8,672,199 B1
(45) Date of Patent: Mar. 18, 2014

(54) ADJUSTABLE ELECTRONIC DEVICE HOLDER MOUNTABLE TO A CART HANDLE

(71) Applicants: Brian Ditore, Jacksonville, FL (US); Glen Connelly, Jacksonville, FL (US); James Ditore, Jacksonville, FL (US)

(72) Inventors: Brian Ditore, Jacksonville, FL (US); Glen Connelly, Jacksonville, FL (US); James Ditore, Jacksonville, FL (US)

(73) Assignee: Smart Cart, Inc., Jacksonville, FL (US)

( * ) Notice: Subject to any disclaimer, the term of this patent is extended or adjusted under 35 U.S.C. 154(b) by 0 days.

(21) Appl. No.: 13/895,859

(22) Filed: May 16, 2013

(51) Int. Cl.
*B62B 5/00* (2006.01)
*B60R 11/00* (2006.01)

(52) U.S. Cl.
USPC ............................ 224/411; 224/570; 224/929

(58) Field of Classification Search
USPC .......... 224/411, 446, 461, 536, 570.501, 929, 224/930; 248/688, 122.1, 371, 214, 176.1, 248/178.1, 309.1, 316.1, 316.2, 316.4, 248/316.8; 379/446, 449, 450, 454, 455; 455/575.8, 575.9
See application file for complete search history.

(56) References Cited

U.S. PATENT DOCUMENTS

| 4,754,901 | A  | * | 7/1988  | Villanueva et al. | ............ 224/418 |
| 6,085,113 | A  | * | 7/2000  | Fan               | ............ 455/569.1 |
| 6,320,962 | B1 | * | 11/2001 | Eisenbraun        | ............ 379/446 |
| 2006/0208073 | A1 | * | 9/2006 | Blaeuer          | ............ 235/383 |

* cited by examiner

*Primary Examiner* — Adam Waggenspack
(74) *Attorney, Agent, or Firm* — Mark Young, P.A.

(57) ABSTRACT

An adjustable electronic device holder mountable to an elongated shopping cart handle includes a base with an advertising panel, a rear support attached to the back of the base at an obtuse angle, a fixed clamping member and a linearly movable clamping member attached at the rear support. Each clamping member has a concave gripping side, which may include a resilient gripping pad. An adjustable fastener, permanent bonding, or integral formation may attach the base to a handle. A deflectable pawl engages a rack along the rear support for locking and releasing the movable clamping member.

17 Claims, 18 Drawing Sheets

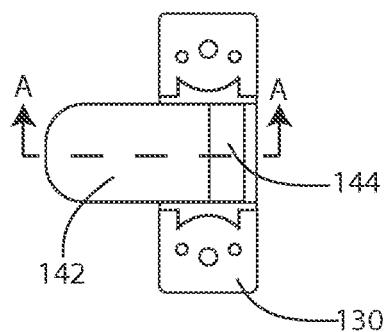 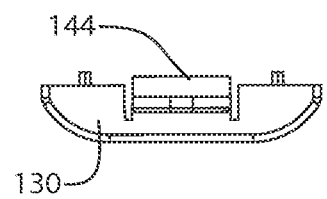
FIGURE 15　　　　　　FIGURE 16
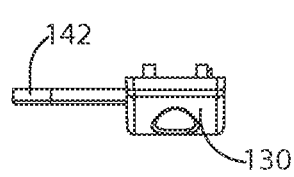 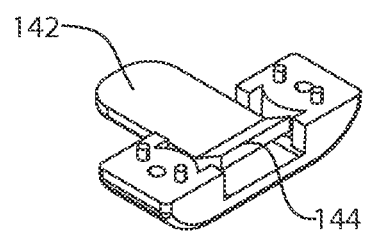
FIGURE 17　　　　　　FIGURE 18
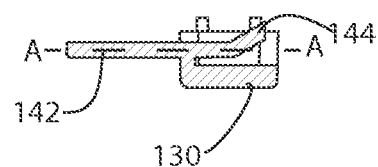
FIGURE 19

ADJUSTABLE ELECTRONIC DEVICE HOLDER MOUNTABLE TO A CART HANDLE

FIELD OF THE INVENTION

This invention relates generally to holders, and, more particularly, to a holder that is suitable for mounting to the elongated handle of a shopping cart, capable of adjusting to hold a wide range of electronic devices such as smart phones in both landscape and portrait orientations, and provides a panel for displaying an advertisement.

BACKGROUND

Using an electronic device, such a smart phone or tablet computing device, while shopping can be advantageous. For example, grocery lists, promotions and electronic coupons may be maintained and displayed on smart phones. Unfortunately, however, adequate means for securing such devices to a shopping cart have not heretofore been developed and commercially deployed. Thus, a shopper using such a device must either hold the device or place it in the cart, from which it can fall or become buried, scratched or seriously damaged.

A wide range of holders have been developed for securing cell phones and personal digital assistants in cars. Typically, each holder is configured to hold a particular size device in a particular orientation. Conventional holders do not adjust to securely receive a wide range of devices in landscape and portrait orientations. Additionally, such conventional holders are not configured for mounting to the handle of a shopping cart.

As smart phone usage proliferates and sophisticated users leverage their devices to facilitate shopping, a suitable holder for a shopping cart is needed. Retailers, unwilling to invest in a non-essential accessory for a shopping cart may be inclined to equip their carts with such holders only if the cost is borne by another party.

Concomitantly, manufacturers seek new media for advertising. Manufacturers would like to display their advertisement to a consumer at the time of a purchasing decision. While a shopping cart would provide a suitable medium for such advertising, shopping cart advertising conducted in the past has not effectively captured the consumer's attention. Such advertising had been limited to a store name imprinted on a handle, which is a permanent fixture of the cart, and cardboard panels displayed on the side of the cart. The cardboard side panels are unnoticeable to consumers pushing a shopping cart. What is needed is a device that will position one or more advertisements in the field of view of the consumer while he or she is shopping, wherein the advertisement can be readily replaced.

The invention is directed to overcoming one or more of the problems and solving one or more of the needs as set forth above.

SUMMARY OF THE INVENTION

To solve one or more of the problems set forth above, in an exemplary implementation of the invention, a holder that is suitable for mounting to the elongated handle of a shopping cart, capable of adjusting to hold a wide range of electronic devices such as smart phones in both landscape and portrait orientations, and provides a panel for displaying an advertisement is provided. In one particular embodiment, the holder includes a base having a top surface with a planar panel, a bottom surface, a front edge and a back edge. The planar panel provides space for displaying an advertisement. A rear support is attached (e.g., integrally formed or a separate piece that is connected) to the back edge of the base at an obtuse angle relative to the top surface of the base. The rear support includes a left side, a right side, and a top free edge. An elongated slot is defined between the rear support panel and the base. The elongated slot has a first end and an opposite second end. A first clamping member attached to the rear support has a first concave clamping side. A second clamping member linearly movable along the elongated slot at the rear support has a second concave clamping side and is opposite the first clamping member. The second clamping member includes a collar that at least partially surrounds a portion of the rear support at the elongated slot. It sufficiently surrounds the rear support to support the second clamping member. The collar moves between the first end of the elongated slot and the second end of the elongated slot. An adjustable fastener, such as cable ties, attached to the bottom surface of the base is adjustable from an open position in which an elongated cart handle may be received to a locked position in which the adjustable fastener securely grips the elongated cart handle. In a preferred embodiment, resilient pads are attached to the first and second concave clamping sides of the first and second clamping members. Additionally, a mounting pad is attached to the bottom surface of the base. The mounting pad secures the adjustable fastener to the base. A toothed rack is also attached to the rear support. In this embodiment, the second clamping member includes a pawl for engaging the toothed rack and a lever for deflecting the pawl away from the toothed rack to allow linear movement of the second clamping member. A clip suitable for holding coupons is attached to the top surface of the base. The clip includes a flexible gripping surface adjacent to the top surface of the base. A support connects the gripping surface to the top surface of the base.

A fixed restraint may be attached to the rear support, opposite the first clamping member. In this embodiment the second clamping member is movable between the first clamping member and the fixed restraint.

In another embodiment, an adjustable electronic device holder mountable to an elongated handle of a shopping cart includes a base having a top surface with a planar panel, a bottom surface, a front edge and a back edge. The planar panel provides space for displaying an advertisement. A rear support attached to the back edge of the base at an obtuse angle relative to the top surface of the base includes a left side, a right side, and a top free edge. A first clamping member attached to the rear support has a concave clamping side. A second clamping member linearly movable along the elongated slot at the rear support has a concave clamping side and is opposite the first clamping member. The second clamping member is slidably coupled to the rear support. An adjustable fastener (e.g., cable ties) attached to the bottom surface of the base is adjustable from an open position in which an elongated handle of a shopping cart may be received to a locked position in which the adjustable fastener securely grips the elongated support. A first resilient pad is attached to the first concave clamping side of the first clamping member. A second resilient pad is attached to the second concave clamping side of the second clamping member. A mounting pad is attached to the bottom surface of the base. The mounting pad secures the adjustable fastener to the base. In an embodiment with a toothed rack attached to the rear support, the second clamping member includes a pawl for engaging the toothed rack and a lever for deflecting the pawl away from the toothed rack to allow linear movement of the second clamping member. A clip attached to the top surface of the base includes a gripping surface adjacent to the top surface of the base, and a support connecting the gripping surface to the top surface of the base.

An optional fixed restraint is attached to the rear support opposite the first clamping member. The second clamping member is movable between the first clamping member and the fixed restraint.

In yet another embodiment, the holder includes a base having a top surface with a planar panel, a bottom surface, a front edge and a back edge. A rear support is attached to the back edge of the base at an obtuse angle relative to the top surface of the base. The rear support includes a left side, a right side, and a top free edge. A first clamping member attached to the rear support has a first concave clamping side. A second clamping member linearly movable along the elongated slot at the rear support has a second concave clamping side and is opposite the first clamping member. The second clamping member is slidably coupled to the rear support. A fastener attached to the bottom surface of the base securely grips an elongated handle of a shopping cart. A first resilient pad is attached to the first concave clamping side of the first clamping member. A second resilient pad is attached to the second concave clamping side of the second clamping member. A mounting pad is attached to the bottom surface of the base. The mounting pad secures the adjustable fastener to the base. In an embodiment with a toothed rack attached to the rear support, the second clamping member includes a pawl for engaging the toothed rack and a lever for deflecting the pawl away from the toothed rack to allow linear movement of the second clamping member. A clip attached to the top surface of the base includes a gripping surface adjacent to the top surface of the base, and a support connecting the gripping surface to the top surface of the base.

An optional fixed restraint is attached to the rear support opposite the first clamping member. The second clamping member is movable between the first clamping member and the fixed restraint.

BRIEF DESCRIPTION OF THE DRAWINGS

The foregoing and other aspects, objects, features and advantages of the invention will become better understood with reference to the following description, appended claims, and accompanying drawings, where:

FIG. 15 is a plan view of a lever and pawl assembly for an exemplary holder with a phone according to principles of the invention; and FIG. 16 is a side view of a lever and pawl assembly for an exemplary holder with a phone according to principles of the invention; and FIG. 17 is another side view of a lever and pawl assembly for an exemplary holder with a phone according to principles of the invention; and FIG. 18 is a perspective view of a lever and pawl assembly for an exemplary holder with a phone according to principles of the invention; and FIG. 19 is a section view of a lever and pawl assembly for an exemplary holder with a phone according to principles of the invention.

DETAILED DESCRIPTION

Figure 1:
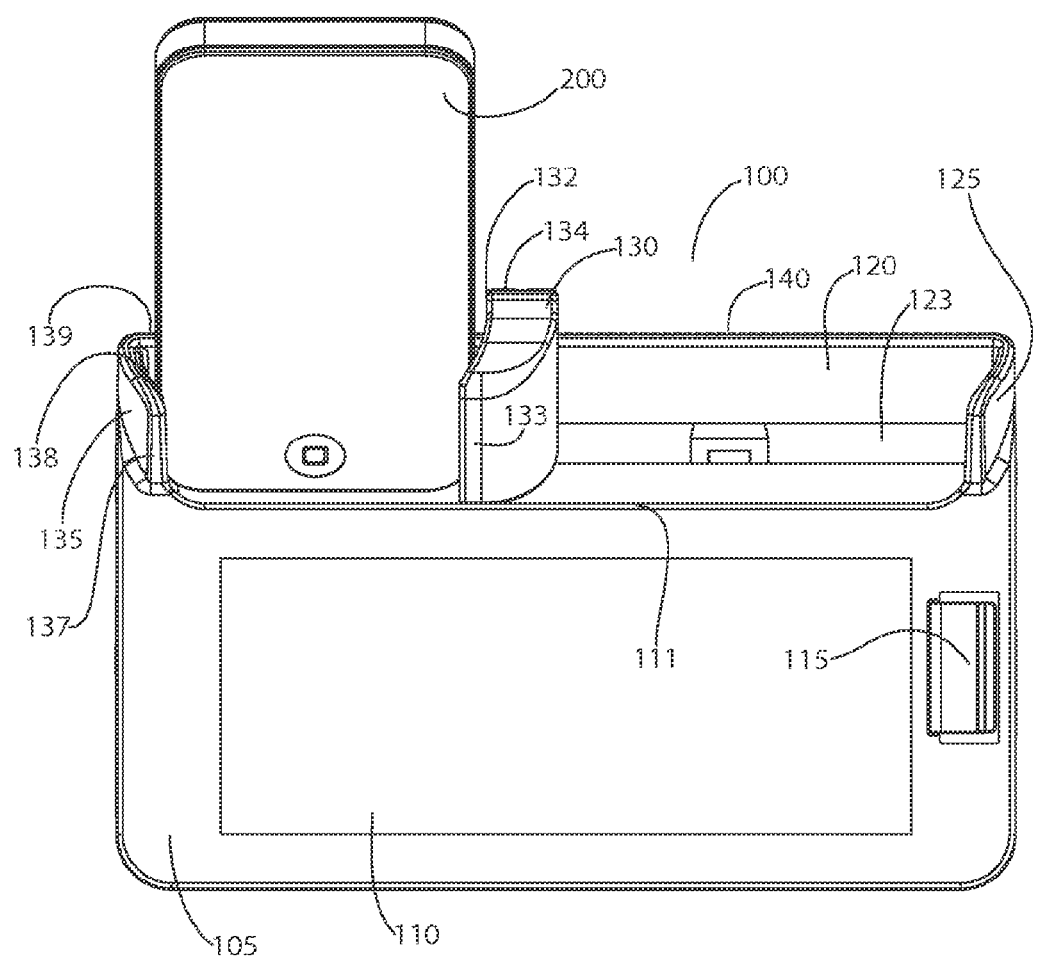
FIG. 1 is a plan view of an exemplary holder with a phone according to principles of the invention.

Referring to FIG. 1, a plan view of an exemplary holder with a phone according to principles of the invention is shown. The holder 100 is shown holding a cell phone 200 in portrait orientation, with its longest dimension vertically oriented. The holder 100 may adjust to hold the cell phone 200 in landscape orientation, with its longest dimension horizontally oriented.

The holder 100 includes a base 105 with an advertising panel 110 recessed into the top of the base 105, as shown in FIGS. 1 and 7-10. One or more advertisements may be displayed on the advertising panel 110. As the holder 100 may be mounted to the handle of a shopping cart, the advertising panel 110 positions the advertisement directly in the field of view of a consumer using the shopping cart. The advertising panel also provides a means for funding the manufacture and installation of the holder 100. Manufacturers of retail goods may provide the holder 100 to a retailer or pay for the holder 100 as part of an advertising program that promotes the manufacturer's goods.

A coupon clip 115 is provided near an edge of the base 105, as shown in FIGS. 1-3 and 6-10. In this embodiment the coupon clip 115 is an integrally molded L-shaped clip. The clip 115 provides a flexible support surface facing the base 105. One or more coupons or other printed material may be inserted between the support surface of the clip 115 and the base 105, where the coupons will be held in place until they are removed by pulling them out from between the support surface of the clip 115 and base 105.

The phone 200 is gripped between opposed clamping members 130, 135. One of the clamping members is movable linearly, relative to the other clamping member 135. By moving the movable clamping member 130, the space between the clamping members 130, 135 is adjustable to accommodate various sized phones and other electronic devices, such as tablets and personal digital assistants.

In a preferred embodiment, the clamping members 130, 135 include resilient gripping surfaces 132, 137. These surfaces 132, 137 by way of example, may be comprised of separately attached or over-molded silicone pads, or similar elastomer pads, suitable for gripping an object, whether overmolded or otherwise attached.

In the preferred embodiment shown in the Figures, one clamping member 135 is stationary while the opposed clamping member 130 is movable in linear fashion, from a widest position to a narrowest position. In the illustrated embodiment, the widest position is defined by a fixed restraint 125. The movable clamping member 130 can move towards the fixed restraint 125 until it abuts the fixed restraint 125. The narrowest position is determined by either the fixed clamping member 135 or the device 200 being held. The movable clamping member 130 may move towards the fixed clamping member 135 until the moveable clamping member 130 either abuts the fixed clamping member 135 or grips the device 200. The range of motion of the movable clamping member 130 is sufficient to accommodate a wide range of devices 200. In a preferred embodiment, the distance between the fixed clamping member 135 and the fixed restraint 125 is about five to eight inches. Thus, allowing ½ inch for the thickness of the movable clamping member, the holder can be used to grip any device having a height or width that is less than or equal to this distance. As many smart phones are shorter than 6 inches and narrower than 3 inches, the holder 100 may be used to hold such a device in portrait orientation as generally illustrated in the figures, or in landscape orientation with the device rotated about 90° from the orientation revealed in the Figures. Likewise, the holder 100 may be sized to hold many small tablet devices having a width and/or height that is less than or equal to this distance.

The fore 133, 137 and aft 134, 138 portions of the clamping members are sufficiently spaced apart to accommodate a wide range of devices. This spaced apart distance is referred to as a clamping thickness. Many devices have different thicknesses. Even a later generation device of the same make and model as an earlier generation device may have a different thickness. Some smart phones are thicker than others. So long as the device 200 has an edge that can be gripped by the clamping members 130, 135, the device 200 can be clamped in the holder 200. This is so even if the devices thickness exceeds the clamping thickness.

Figure 20:
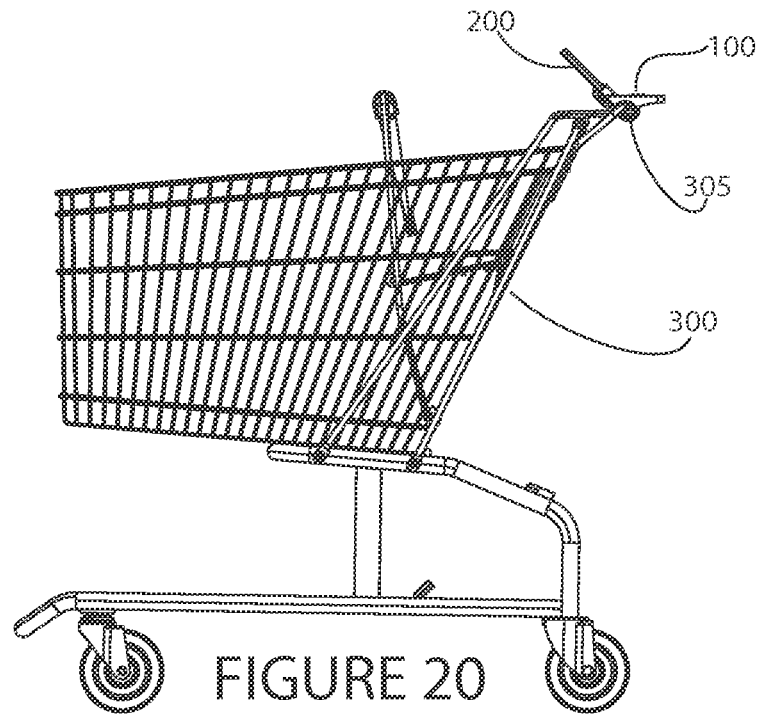
FIG. 20 is a side view of cart equipped with an exemplary holder with a phone according to principles of the invention.
Figure 21:
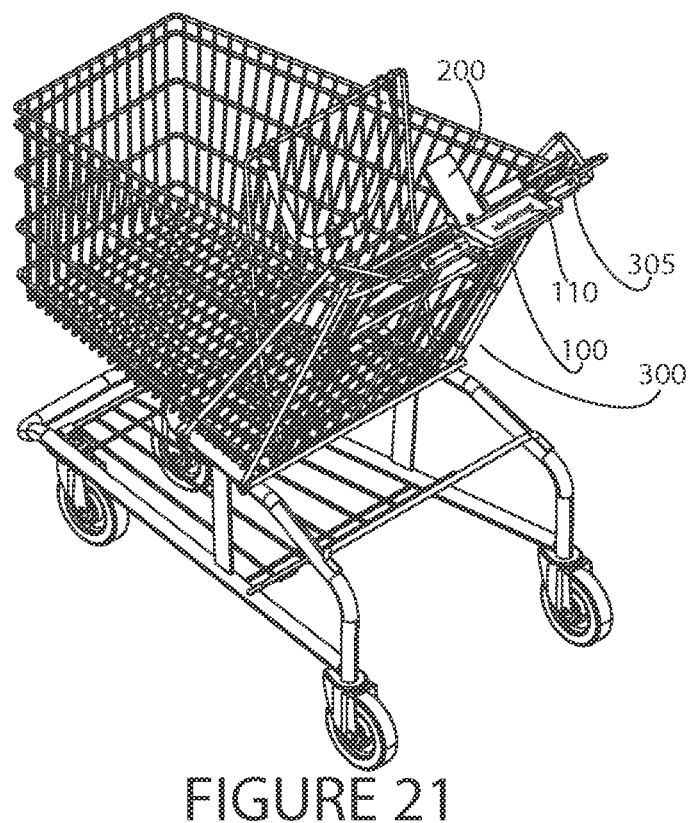
FIG. 21 is a perspective view of cart equipped with an exemplary holder with a phone according to principles of the invention.

In a preferred embodiment, the thickness of the device 200 does not exceed the slot thickness 122. The elongated slot 123 is defined by the space between a support shoulder 120 and the back edge 111 of the base 105. The support shoulder 120 is a rear panel attached to the back edge of the base 105 at an obtuse angle relative to the top surface of the base 105. This angle ensures visibility of the held phone 200 when the holder 100 is clamped to the handle of a cart 300, as shown in FIGS. 20 and 21. In a preferred implementation, the bottom edge of the clamped device 200 is supported above the slot 123. Thus the slot 123 is sized to prevent an edge of the device 200 from sliding through. As many smart phones and small tablet devices have a thickness that is less than ½ inch, a slot thickness 122 of approximately ⅜" or less is suitable for receiving a wide range of devices. The slot 123 also defines a range of linear movement of the movable clamping member 130. The movable clamping member 130 fully or partially surrounds a portion of the rear panel 120, said portion being within the extent of the slot 123.

The movable clamp 130 preferably includes a ratcheting mechanism or other similar mechanism to allow movement along a range of positions and securely lock the clamp 130 into a desired position within the range. The ratcheting mechanism may comprise a biased pawl 144 with a release lever 142, as illustrated in FIGS. 15 through 19. The pawl 144 is configured to engage the teeth of the rack 140. When the lever 142 is pressed, the pawl 144 moves (e.g., pivots or flexes) away from the teeth of the rack 140, thereby allowing free movement. The rack 140 is shown in FIGS. 4, 5, 11 and 12. When the lever 142 is released, the pawl 144 returns to a space between adjacent teeth of the rack 140, thus resisting further side to side movement. In an alternative lever configuration, the lever 142 releases a pawl 144 when the lever is flexed away from the rack 140. The teeth spacing is sufficiently slight to define a large number of locking positions, each within a very short distance from the next, In an exemplary embodiment, the rack provides at least about 100 locking positions from the widest to narrowest positions. In such an embodiment, each position is about 1% of the maximum movable distance from the next.

Concomitantly, the gripping pad is compressible and resilient. Additionally, the thickness of a gripping pad is preferably at least one locking position increment. This allows the compressible resilient pad to be squeezed against the device and locked into position for a secure non-slip clamping fit.

Figure 2:
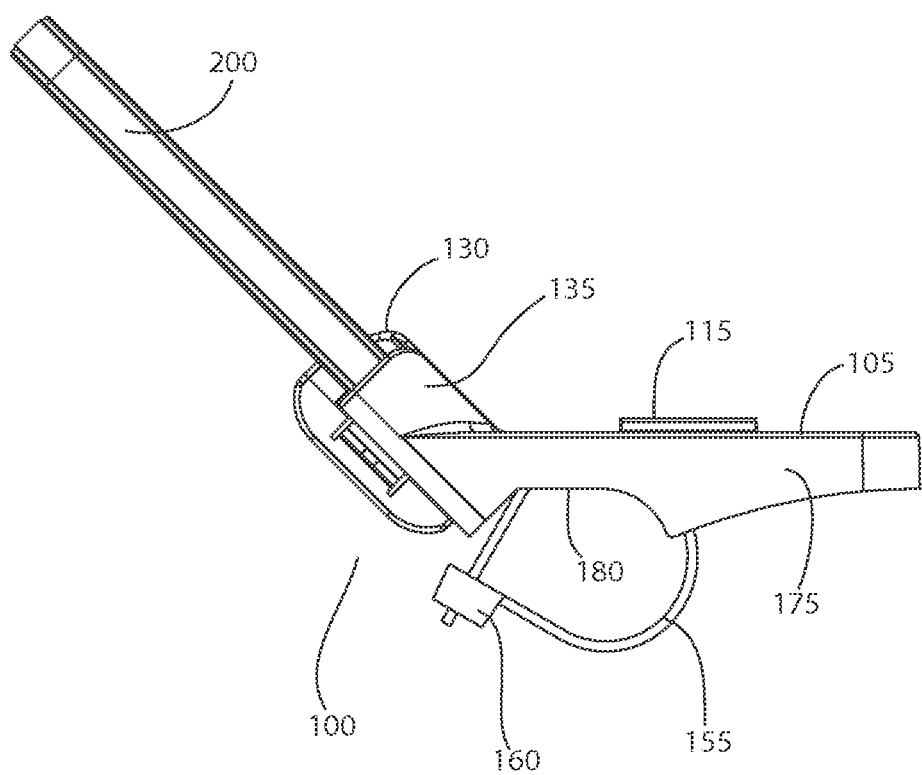
FIG. 2 is a side view of an exemplary holder with a phone according to principles of the invention.
Figure 3:
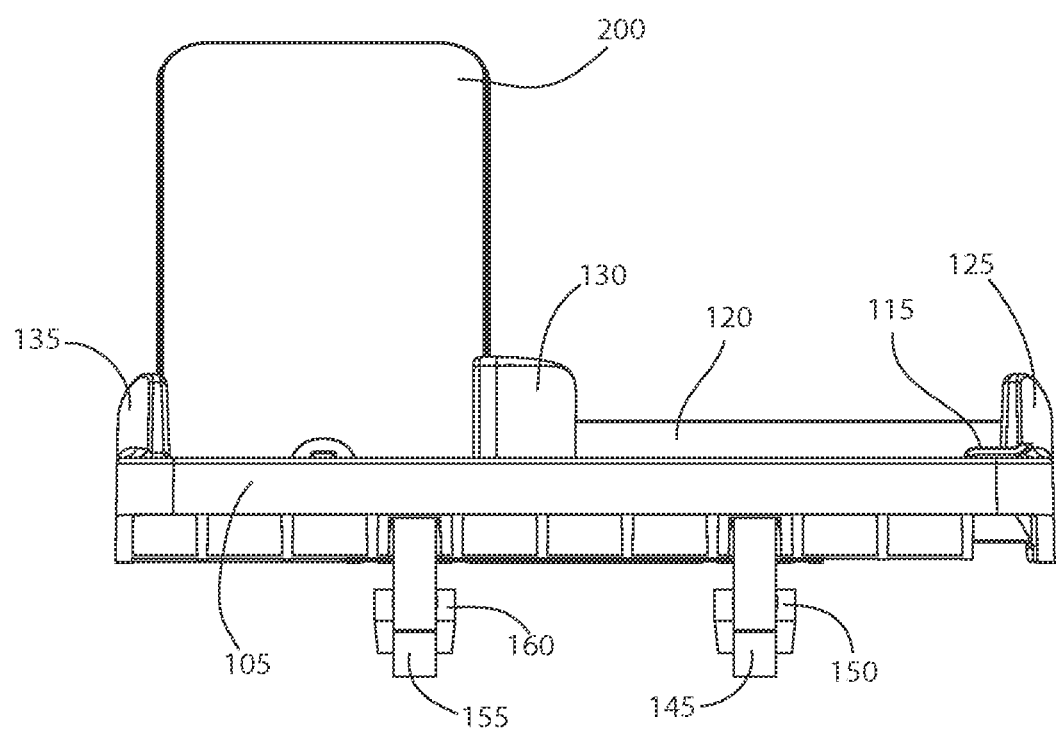
FIG. 3 is a front view of an exemplary holder with a phone according to principles of the invention.
Figure 4:
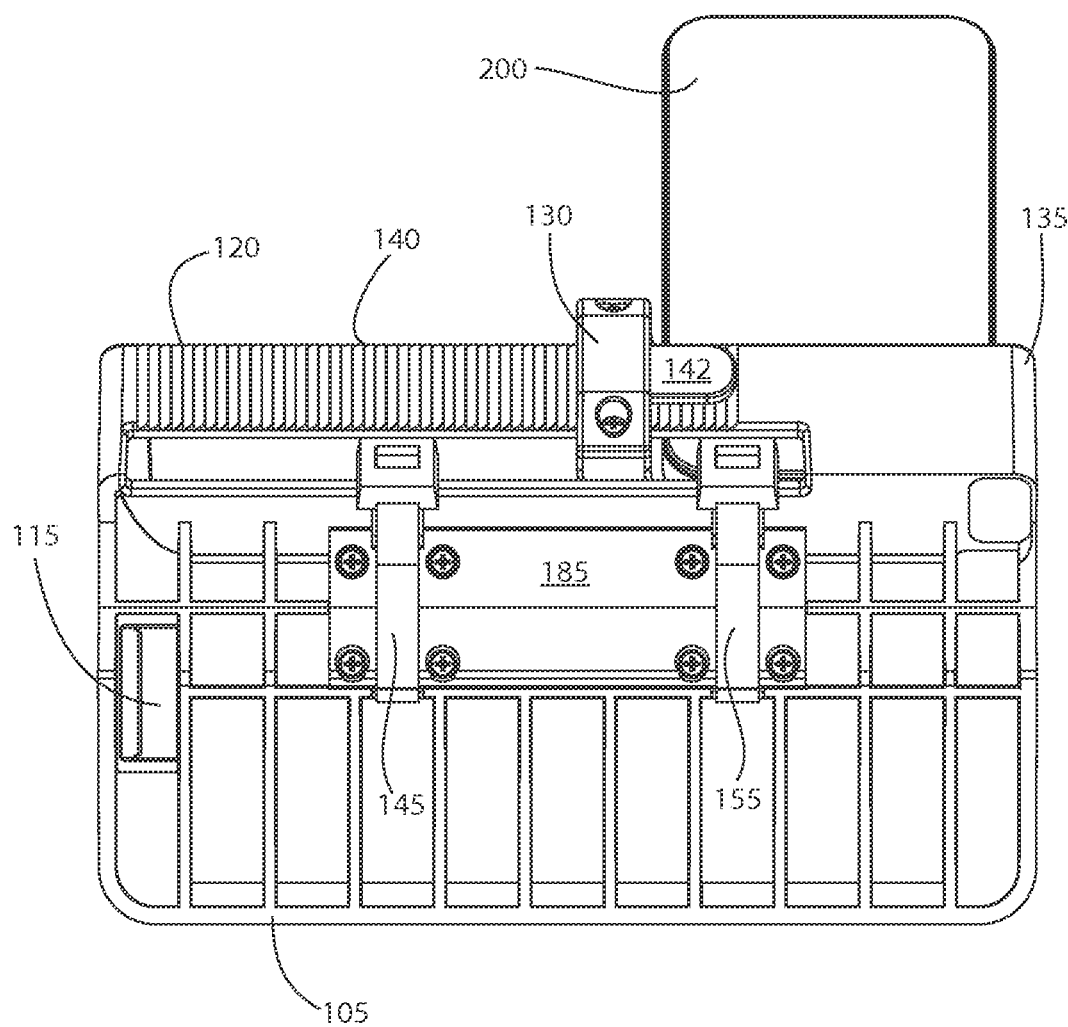
FIG. 4 is a bottom view of an exemplary holder with a phone according to principles of the invention.
Figure 5:
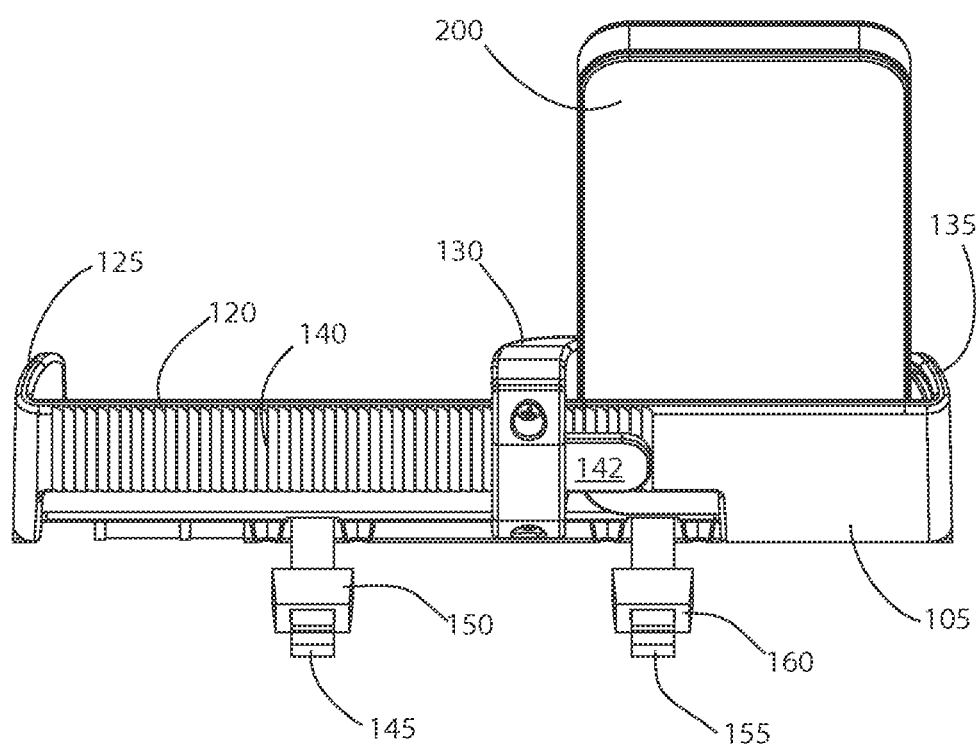
FIG. 5 is a back view of an exemplary holder with a phone according to principles of the invention.
Figure 6:
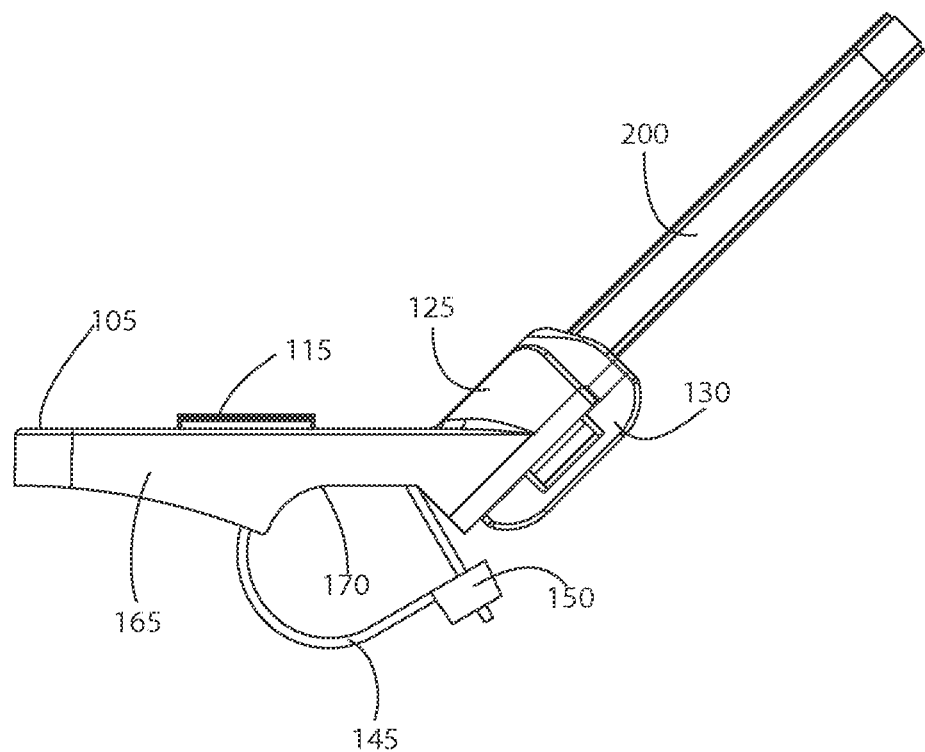
FIG. 6 is another side view of an exemplary holder with a phone according to principles of the invention.
Figure 7:
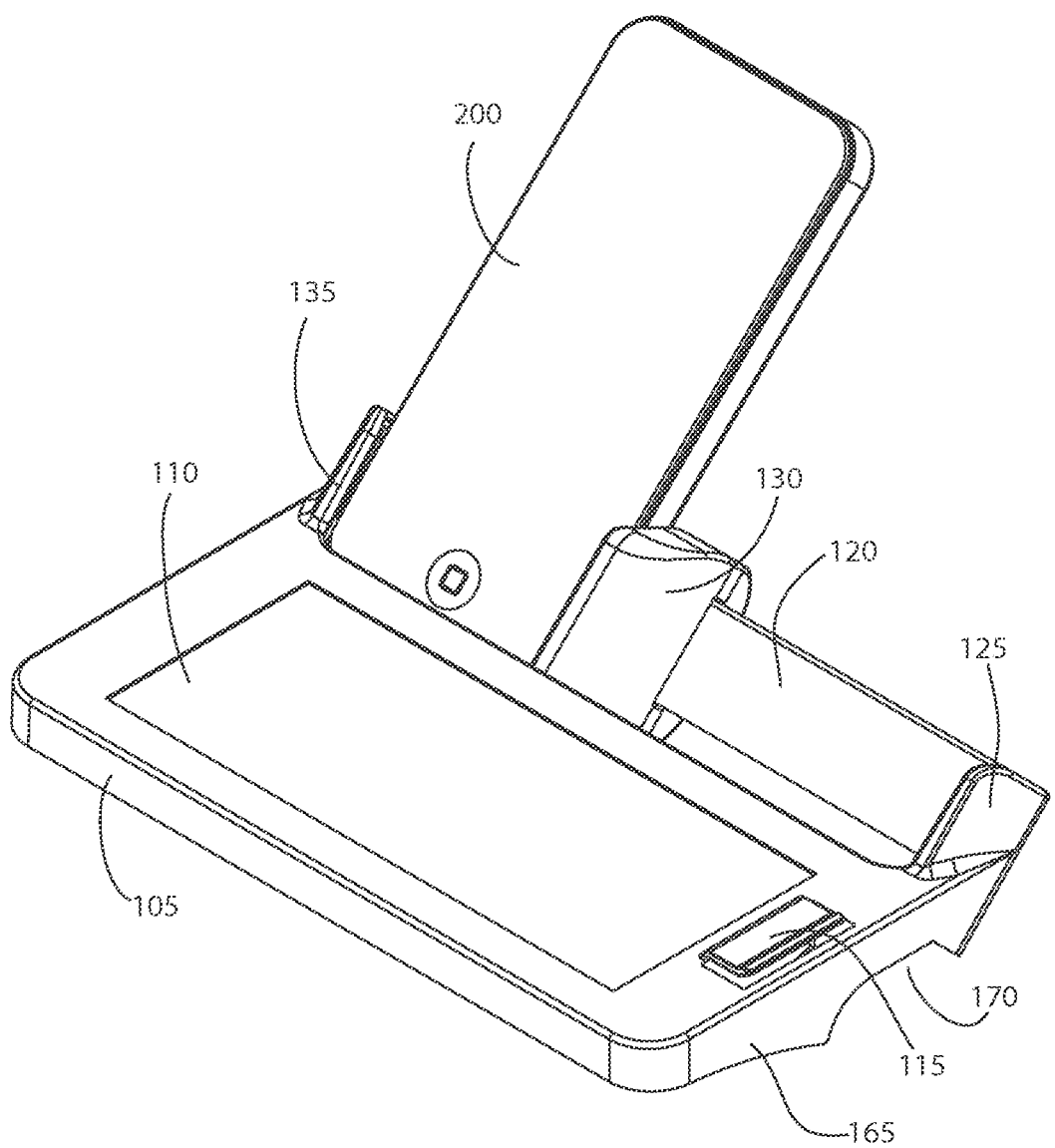
FIG. 7 is a top perspective view of an exemplary holder with a phone according to principles of the invention.
Figure 8:
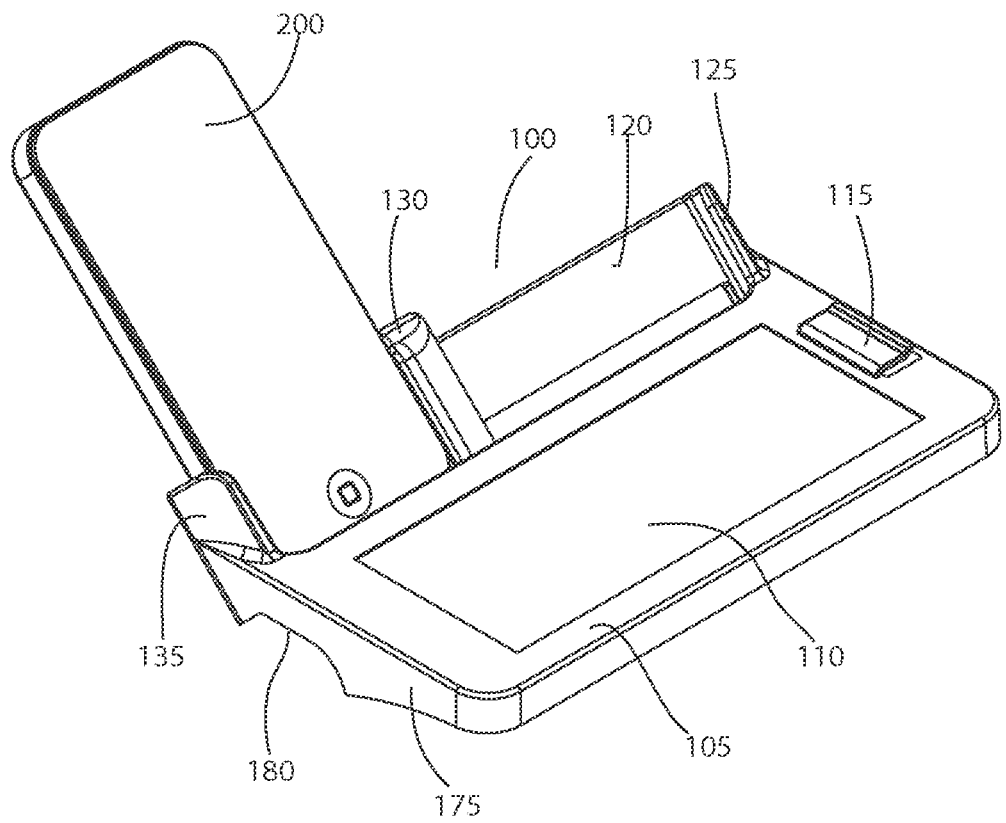
FIG. 8 is another top perspective view of an exemplary holder with a phone according to principles of the invention.
Figure 9:
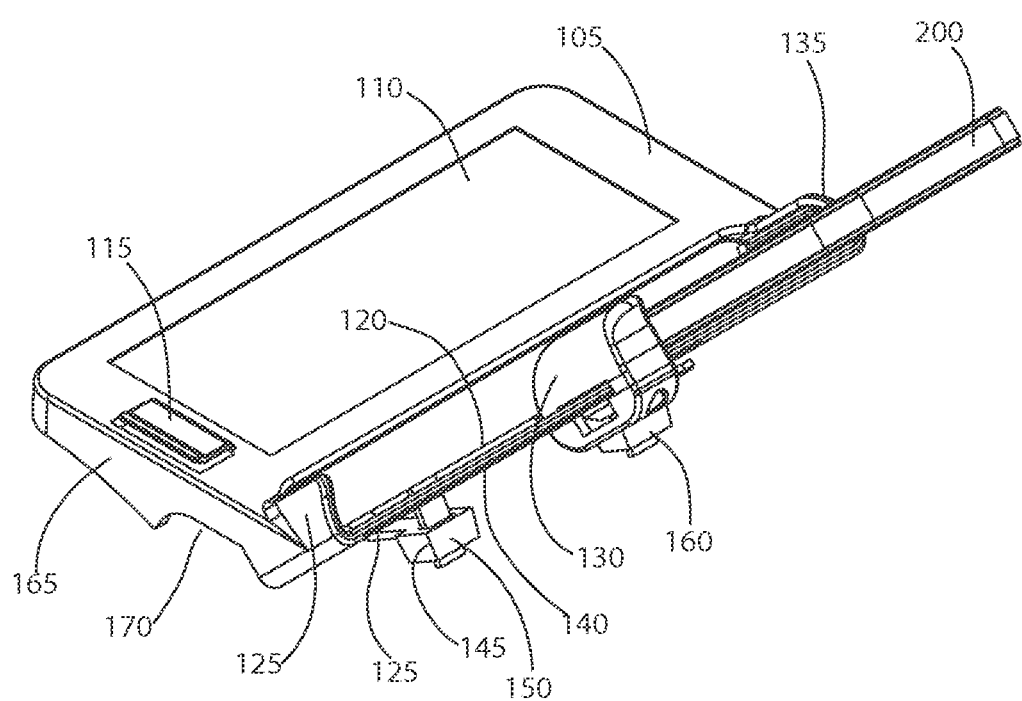
FIG. 9 is another top perspective view of an exemplary holder with a phone according to principles of the invention.
Figure 10:
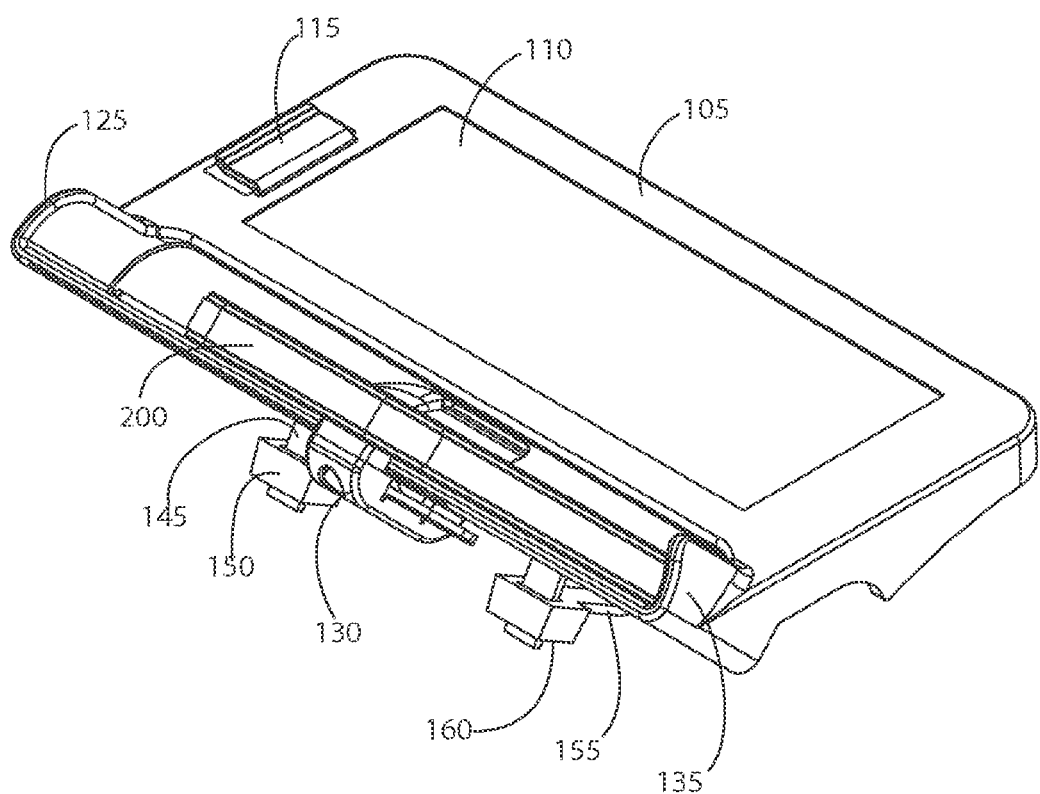
FIG. 10 is another top perspective view of an exemplary holder with a phone according to principles of the invention.
Figure 11:
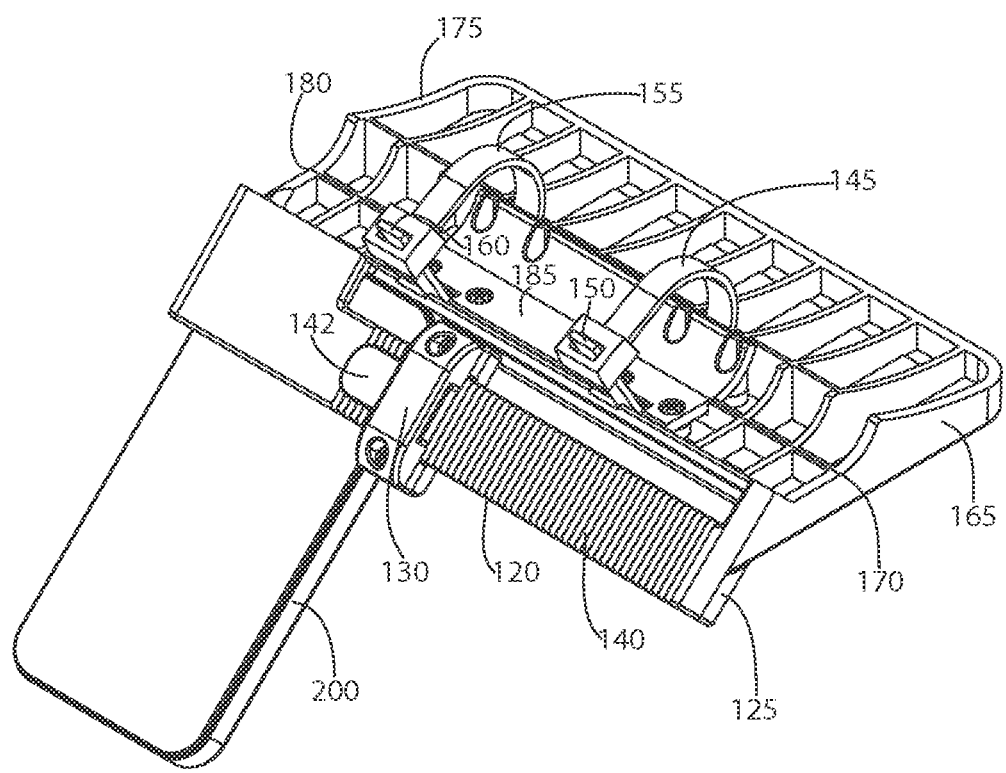
FIG. 11 is a bottom perspective view of an exemplary holder with a phone according to principles of the invention.
Figure 12:
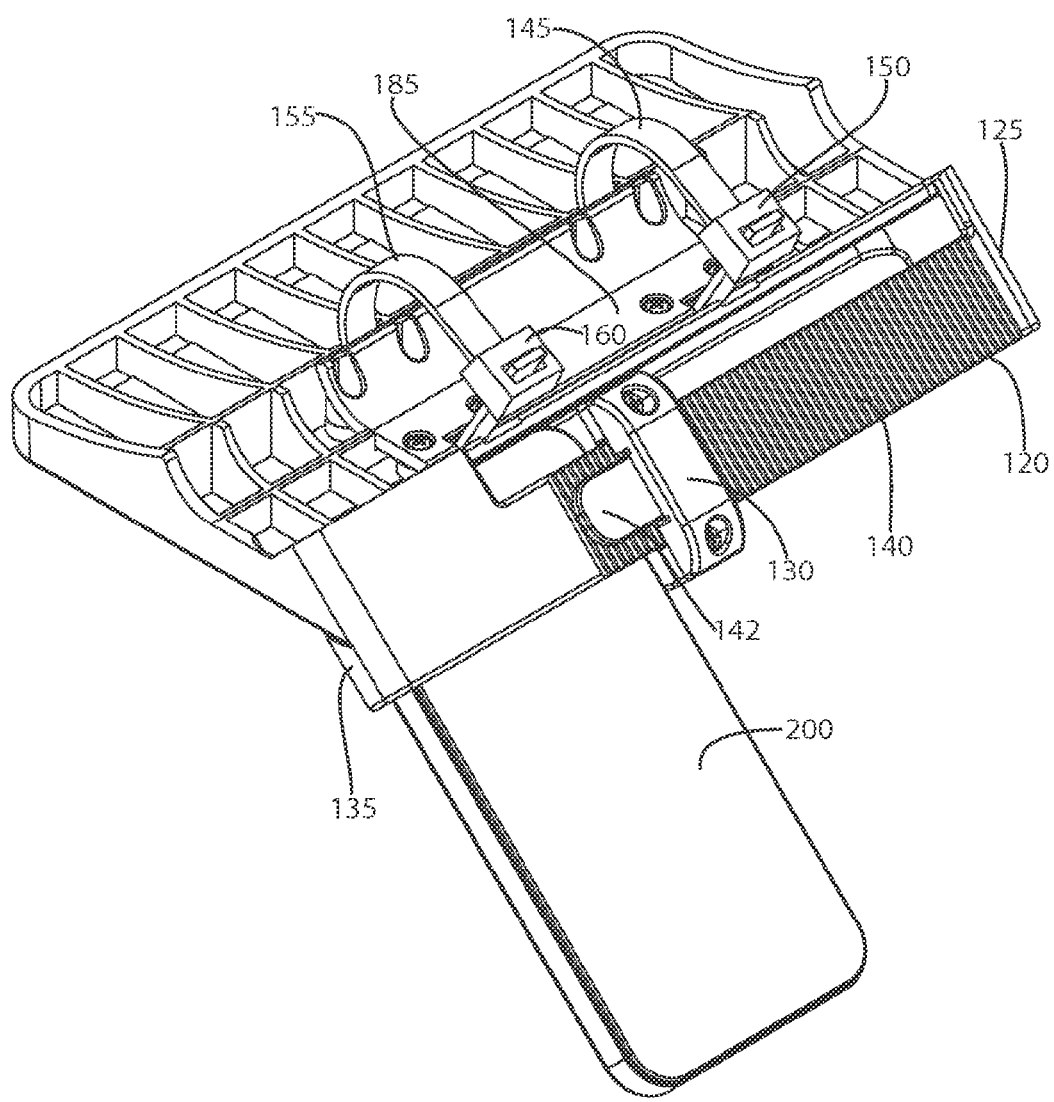
FIG. 12 is another bottom perspective view of an exemplary holder with a phone according to principles of the invention.
Figure 13:
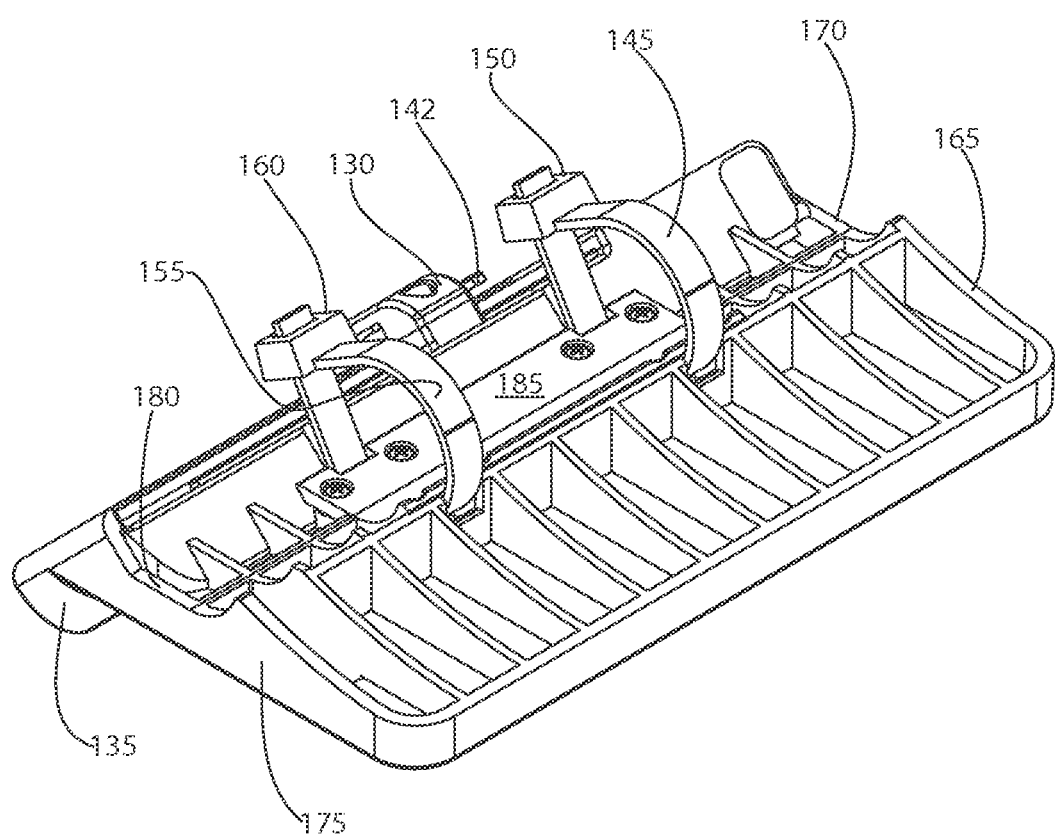
FIG. 13 is another bottom perspective view of an exemplary holder with a phone according to principles of the invention.
Figure 14:
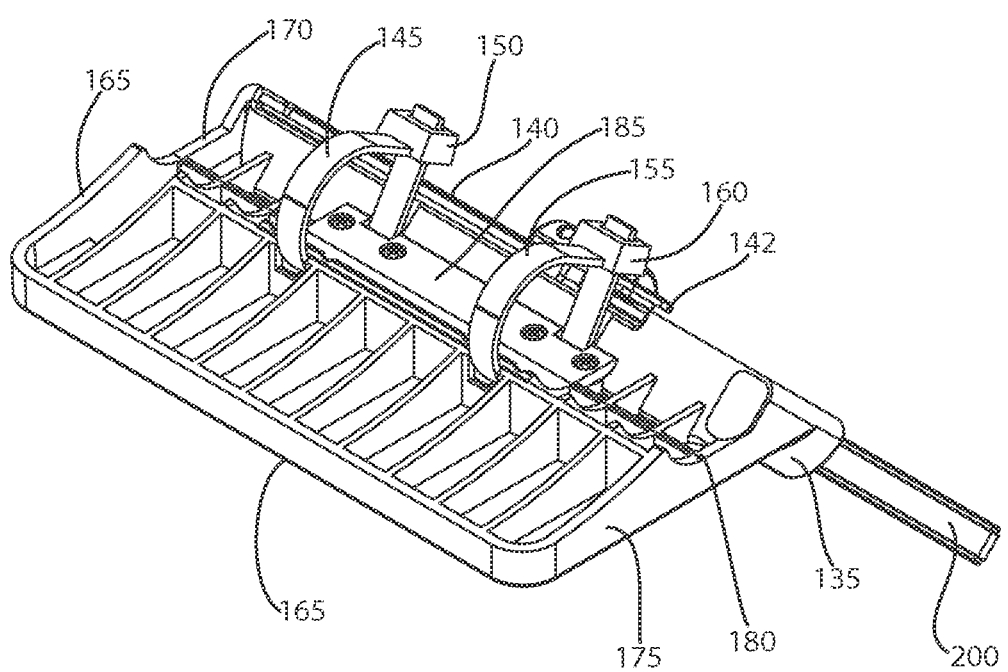
FIG. 14 is another bottom perspective view of an exemplary holder with a phone according to principles of the invention.

Referring now to FIGS. 2 and 6, opposite side views of the exemplary holder with a phone according to principles of the invention are shown. The side panel 175 includes a cutout 180 to receive a handle of a shopping cart or a similar support structure. A similar side panel 165 and cutout 170 are provided on the opposite side of the holder 100. One or more cable ties, each having an adjustable band 145, 155 and a locking head 150, 160, as shown in FIGS. 2-6, is provided to secure the holder 100 to the handle of a shopping cart or a similar support.

Fixed restraint 125 defines the rightmost position. Movable clamping member 130 may linearly translate towards the fixed restraint 125 until it abuts the fixed restraint 125 and in the opposite direction towards the opposite clamping member 135, which is a fixed clamping member. The fixed restraint prevents inadvertent removal of the movable clamping member 130. The phone 200 is gripped between opposed clamping members 130, 135. One of the clamping members 130 is movable linearly, relative to the other clamping member 135. By moving the movable clamping member 130, the space between the clamping members 130, 135 is adjustable to accommodate various sized phones and other electronic devices, such as tablets and personal digital assistants.

To install the holder 100 on a cart, the cutouts 170, 180 are positioned on the handle and the cable ties are securely fastened around the handle. For removal, the bands 145, 155 of the cable ties are severed, such as by cutting with scissors or a knife. The cut cable ties may be replaced by un-cut cable ties for re-installation.

Fasteners other than cable ties may be used within the scope of the invention. By way of example and not limitation, a hose clamp, marman clamp, wire rope clamp, band clamp, web clamp, C-clamp, pipe clamp or any other device capable of gripping the handle of a cart and supporting the holder 100, may be utilized within the scope of the invention.

The bottom surface of the holder 100, as shown in FIGS. 4 and 11 through 14, includes a mounting pad assembly 185 which serves a few purposes. First the mounting pad assembly provides a pad-like structure configured to grip a handle of a shopping cart or similar support. Second, the mounting pad assembly 185, which is attached to the bottom of the support with attachments such as snap fit connections or screws, includes slots through which the bands of the cable ties pass. Thus, the bands 145, 155 of cable ties are held between the mounting pad assembly 185 and the bottom of the holder. The mounting pad assembly 185 may include a resilient elastomeric non-slip surface, such as a Neoprene® (DuPont), silicone, or other plastic elastomer for securely gripping the shopping cart handle when the cable ties are drawn tight.

FIGS. 20 and 21 illustrate a cart 300 equipped with an exemplary holder 100 with a phone 200 according to principles of the invention. The holder 100 is mounted to the handle 305 of the cart 300. Phone 200 is securely held by the holder 100. The panel 110 on which an advertisement is displayed is clearly visible to the shopper while he or she uses the cart. The shopper may place the phone 200 in the holder in portrait or landscape orientation. The phone may display a shopping list, digital coupons, and other information relevant to a shopping experience.

Figure 22:
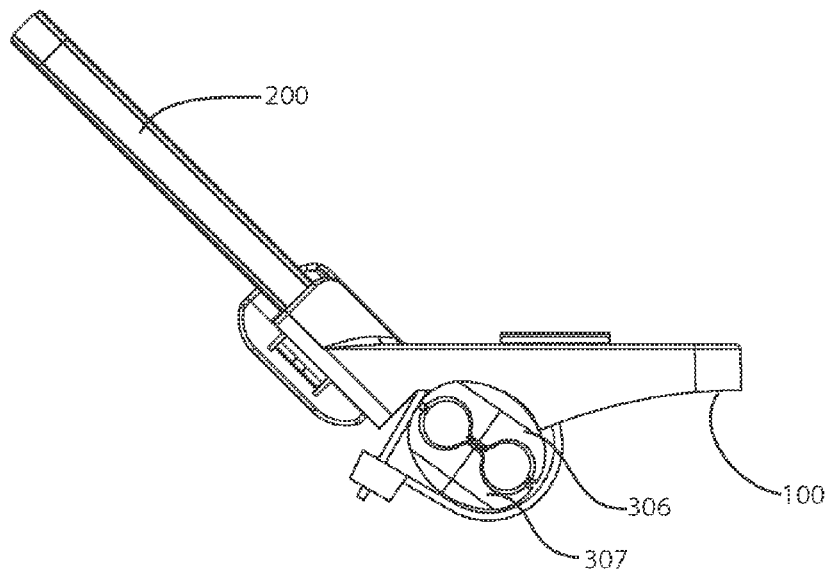
FIG. 22 is a side view of cart handle equipped with an exemplary holder with a phone according to principles of the invention.
Figure 23:
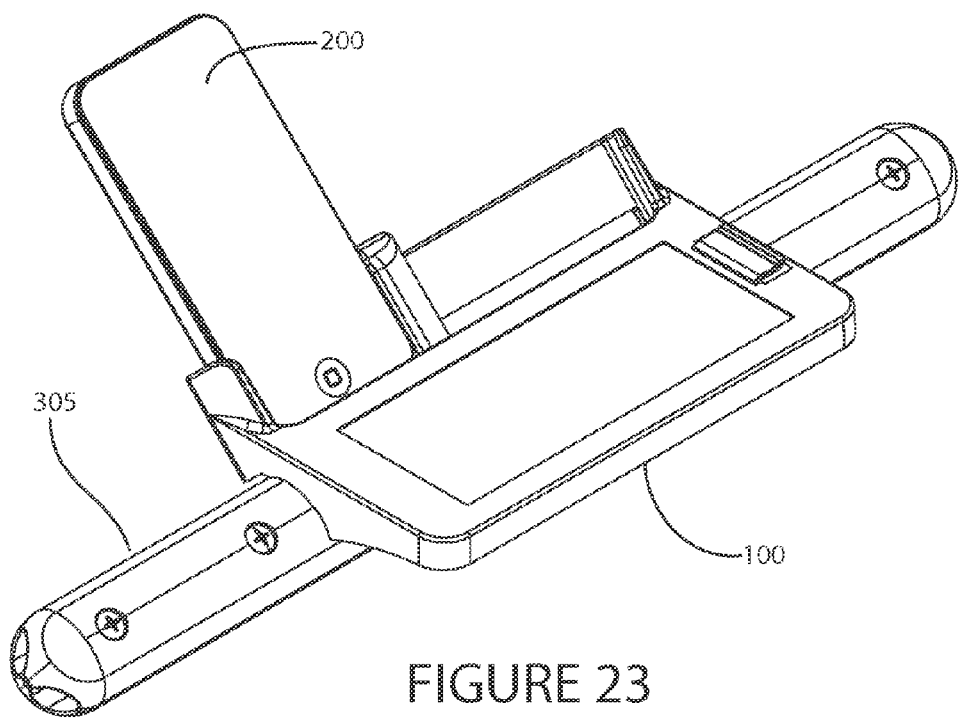
FIG. 23 is a perspective view of cart handle equipped with an exemplary holder with a phone according to principles of the invention.

With reference now to FIGS. 22 and 23, side and perspective views of the holder assembly 100 attached to a handle 305 of the cart 300 are provided. The exemplary handle 305 comprises two halves 306, 307 connected together with screws. However, the invention is not limited to use with such any particular handle.

Figure 24:
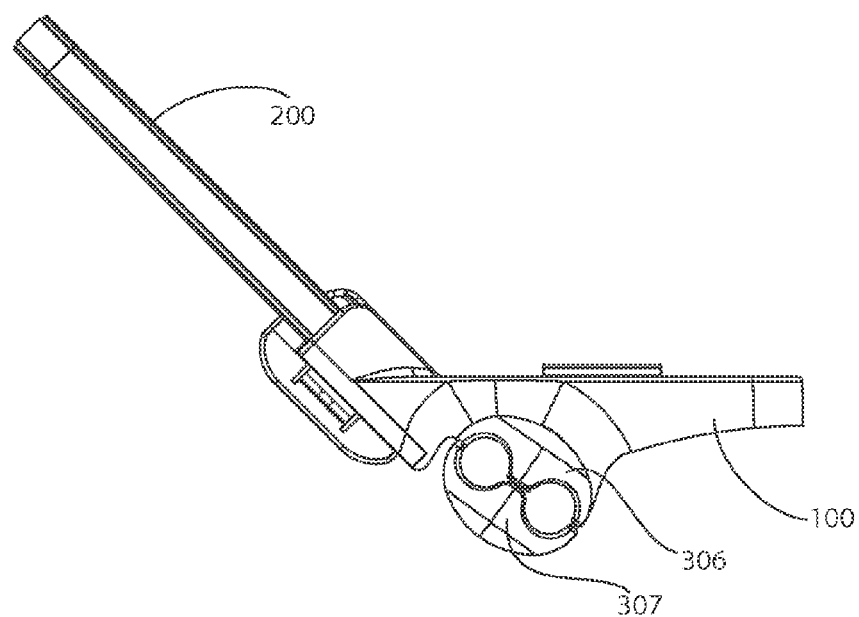
FIG. 24 is a side view of cart handle equipped with an exemplary holder with a phone according to principles of the invention.
Figure 25:
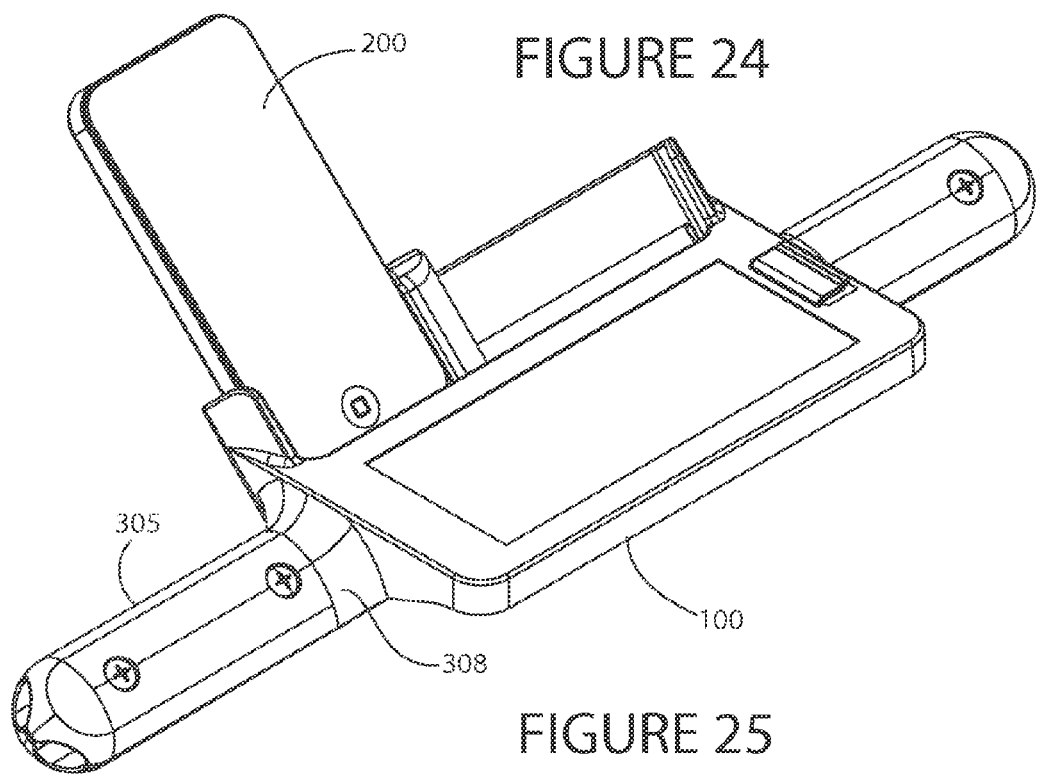
FIG. 25 is a perspective view of cart handle equipped with an exemplary holder with a phone according to principles of the invention; and Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

In FIGS. 24 and 25, the holder assembly 100 is shown attached to an exemplary handle 305 by bonding 308 or integral formation, or otherwise. More specifically, in the exemplary embodiment shown in FIGS. 24 and 25, the holder assembly 100 is attached to the top half 306 of the handle 305, by bonding 308 or integral formation.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An adjustable electronic device holder mountable to an elongated cart handle with opposite fixed ends, said holder comprising:
    a base having a top surface with a planar panel, a bottom surface, a front edge and a back edge, the planar panel providing space for displaying an advertisement;
    a rear support attached to the back edge of the base at an obtuse angle relative to the top surface of the base, said rear support including a left side, a right side, and a top free edge;
    an elongated slot defined between the rear support and the base, said elongated slot having a first end and an opposite second end;
    a first clamping member attached to the rear support, said first clamping member having a first concave clamping side;
    a second clamping member linearly movable along the elongated slot at the rear support, said second clamping member having a second concave clamping side and being opposite the first clamping member, and said second clamping member including a collar that at least partially surrounds a portion of the rear support at the elongated slot, said collar being movable between the first end of the elongated slot and the second end of the elongated slot; a toothed rack attached to the rear support; and wherein the collar comprises a pawl for engaging the toothed rack and a lever for deflecting the pawl away from the toothed rack to allow linear movement of the second clamping member.

2. The adjustable electronic device holder according to claim 1, further comprising an adjustable fastener attached to the bottom surface of the base, said adjustable fastener being adjustable from an open position in which an elongated cart handle may be received to a locked position in which the adjustable fastener securely grips the elongated cart handle.

3. The adjustable electronic device holder according to claim 1, further comprising a first resilient pad attached to the first concave clamping side of the first clamping member and a second resilient pad attached to the second concave clamping side of the second clamping member.

4. The adjustable electronic device holder according to claim 3, further comprising a mounting pad attached to the bottom surface of the base and said mounting pad securing the adjustable fastener to the base.

5. The adjustable electronic device holder according to claim 4, further comprising a clip attached to the top surface of the base, said clip comprising a flexible gripping surface adjacent to the top surface of the base, and a support connecting the flexible gripping surface to the top surface of the base.

6. The adjustable electronic device holder according to claim 5, further comprising a fixed restraint attached to the rear support opposite the first clamping member, and said second clamping member being movable between the first clamping member and the fixed restraint.

7. The adjustable electronic device holder according to claim 6, said adjustable fastener comprising at least two cable ties.

8. An adjustable electronic device holder mountable to an elongated handle of a shopping cart, said elongated handle having opposite fixed ends, said holder comprising:

a base having a top surface with a planar panel, a bottom surface, a front edge and a back edge, the planar panel providing space for displaying an advertisement;

a rear support attached to the back edge of the base at an obtuse angle relative to the top surface of the base, said rear support including a left side, a right side, and a top free edge;

a first clamping member attached to the rear support, said first clamping member having a first concave clamping side;

a second clamping member linearly movable along the elongated slot at the rear support, said second clamping member having a second concave clamping side and being opposite the first clamping member, and said second clamping member being slidably coupled to the rear support; and an adjustable fastener attached to the bottom surface of the base, said adjustable fastener being adjustable from an open position in which an elongated handle of a shopping cart may be received to a locked position in which the adjustable fastener securely grips the elongated support; said second clamping member including a collar that at least partially surrounds a portion of the rear support at the elongated slot, said collar being movable between the first end of the elongated slot and the second end of the elongated slot; a toothed rack attached to the rear support; and wherein the collar comprises a pawl for engaging the toothed rack and a lever for deflecting the pawl away from the toothed rack to allow linear movement of the second clamping member.

9. The adjustable electronic device holder according to claim 8, further comprising a first resilient pad attached to the first concave clamping side of the first clamping member and a second resilient pad attached to the second concave clamping side of the second clamping member.

10. The adjustable electronic device holder according to claim 8, further comprising a mounting pad attached to the bottom surface of the base and said mounting pad securing the adjustable fastener to the base.

11. The adjustable electronic device holder according to claim 8, further comprising a clip attached to the top surface of the base, said clip comprising a gripping surface adjacent to the top surface of the base, and a support connecting the gripping surface to the top surface of the base.

12. The adjustable electronic device holder according to claim 8, further comprising a fixed restraint attached to the rear support opposite the first clamping member, and said second clamping member being movable between the first clamping member and the fixed restraint.

13. The adjustable electronic device holder according to claim 8, said adjustable fastener comprising at least two cable ties.

14. An adjustable electronic device holder mountable to an elongated handle of a shopping cart, said elongated handle having opposite fixed ends, said holder comprising:

a base having a top surface with a planar panel, a bottom surface, a front edge and a back edge;

an elongated slot defined between the rear support and the base, said elongated slot having a first end and an opposite second end;

a rear support attached to the back edge of the base at an obtuse angle relative to the top surface of the base, said rear support including a left side, a right side, and a top free edge;

a first clamping member attached to the rear support, said first clamping member having a first concave clamping side;

a second clamping member linearly movable along the elongated slot at the rear support, said second clamping member having a second concave clamping side and being opposite the first clamping member, and said second clamping member being slidably coupled to the rear support; and said second clamping member including a collar that at least partially surrounds a portion of the rear support at the elongated slot, said collar being movable between the first end of the elongated slot and the second end of the elongated slot; a toothed rack attached to the rear support; and wherein the collar comprises a pawl for engaging the toothed rack and a lever for deflecting the pawl away from the toothed rack to allow linear movement of the second clamping member;

a fastener attached to the bottom surface of the base, said fastener securely gripping an elongated handle of a shopping cart.

15. The adjustable electronic device holder according to claim 14, further comprising a first resilient pad attached to the first concave clamping side of the first clamping member and a second resilient pad attached to the second concave clamping side of the second clamping member.

16. The adjustable electronic device holder according to claim 14, further comprising a mounting pad attached to the bottom surface of the base and said mounting pad securing the adjustable fastener to the base.

17. The adjustable electronic device holder according to claim 14, further comprising a clip attached to the top surface of the base, said clip comprising a gripping surface adjacent to the top surface of the base, and a support connecting the gripping surface to the top surface of the base, and a fixed restraint attached to the rear support opposite the first clamping member, and said second clamping member being movable between the first clamping member and the fixed restraint.

* * * * *